2 Sheets--Sheet 1.
J. STRAUS.
Side-Saddle Trees.
No. 5,609. Reissued Oct. 14, 1873.
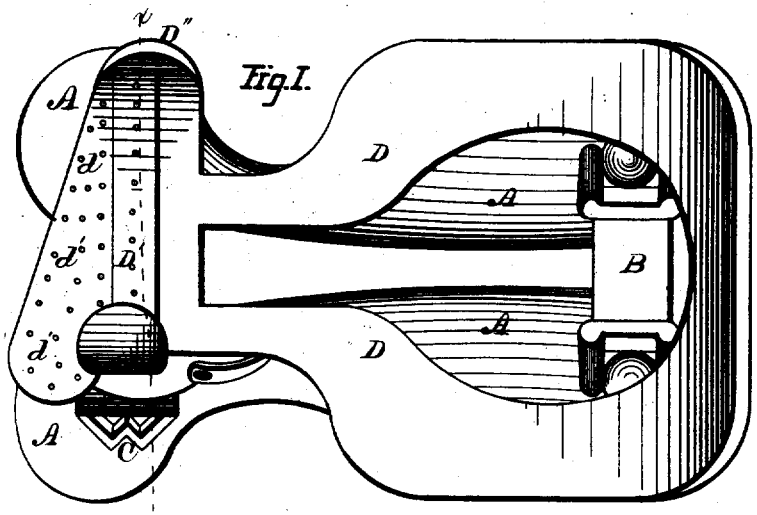
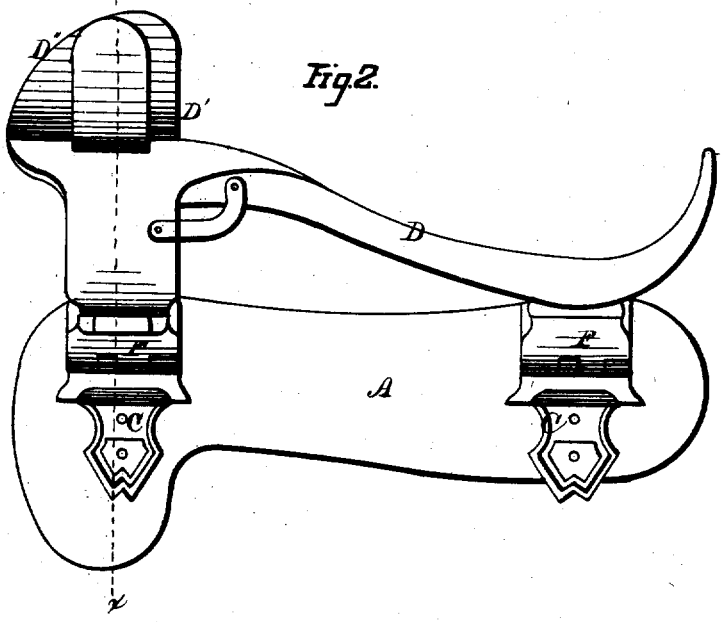
WITNESSES:
Jas. E. Hutchinson
John R. Young
INVENTOR.
Jacob Straus, by
Prindle and Deane, his
Attorneys.
A.M. PHOTO-LITHOGRAPHIC CO. N.Y. (OSBORNE'S PROCESS.)

2 Sheets--Sheet 2.
J. STRAUS.
Side-Saddle Trees.
No. 5,609. Reissued Oct. 14, 1873.
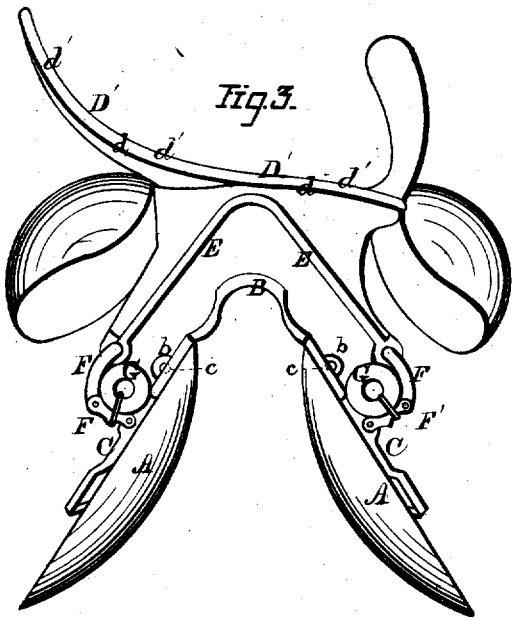
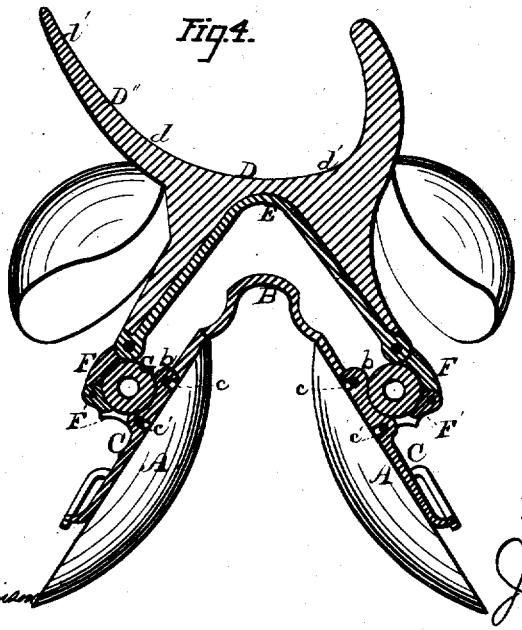
WITNESSES:
Jas. E. Hutchinson
John R. Young
INVENTOR.
Jacob Straus, by
Prindle and Deane, his
Attorneys
A.M. PHOTO-LITHOGRAPHIC Co. N.Y. (OSBORNE'S PROCESS.)

UNITED STATES PATENT OFFICE.

JACOB STRAUS, OF ST. LOUIS, MISSOURI.

IMPROVEMENT IN SIDE-SADDLE TREES.

Specification forming part of Letters Patent No. 103,101, dated May 17, 1870; reissue No. 5,609, dated October 14, 1873; application filed October 4, 1873.

*To all whom it may concern:*

Be it known that I, JACOB STRAUS, of St. Louis, in the county of St. Louis and State of Missouri, did invent certain new and useful Improvements in Saddle-Trees, for which Letters Patent No. 103,101 were issued to me upon the 17th day of May, 1870, which Letters Patent have been found defective, in that the specification and claims do not cover and embrace all of the original invention and improvements as contained in the model and drawings filed in the United States Patent Office upon the 30th day of March, 1870. Now, therefore, being desirous to reissue said Letters Patent in the manner and form prescribed by law, I have prepared and do hereby declare that the following is a full, clear, and exact description of the said improvements, reference being had to the accompanying drawings making a part of this specification, in which—

Figure 1 is a plan view of the upper side of my improved saddle-tree. Fig. 2 is a side elevation of the same. Fig. 3 is an elevation of the forward end of said tree, and Fig. 4 is a vertical section upon line *x x* of Figs. 1 and 2.

Letters of like name and kind refer to like parts in each of the figures.

The object of my invention is to increase the ease and comfort of a saddle-tree without material addition to its cost; and it consists principally in the peculiar construction and combination of the connecting portions of the saddle-tree bars and seat, substantially as and for the purpose hereinafter specified. It consists, further, in the means employed for securing an elastic yielding connection between the saddle-tree bars and seat, substantially as and for the purpose hereinafter shown. It consists, further, in the means employed for connecting together the saddle-tree bars, substantially as and for the purpose hereinafter set forth. It consists, further, in the peculiar construction of the pommel, substantially as and for the purpose hereinafter shown and described. It consists, finally, in the device as a whole, when its several parts are constructed and combined to operate in the manner and for the purpose substantially as is hereinafter specified.

In the annexed drawings, A and A represent two saddle-tree bars constructed in the usual form, their inner lower sides being curved to conform to the shape of the horse's back. The tree-bars are connected together by means of an ∩-shaped strap, B, which is provided upon its ends with horizontal pivotal lugs *b*, that rest within semi-cylindrical grooves *c* formed in the inner sides and upper ends of two plates, C and C, which plates are secured to or upon the outer faces of said tree-bars in any suitable manner, said arrangement of parts permitting said tree-bars to have a radial motion upon said lugs *b*, so as to enable them to automatically adjust themselves to a wide or a narrow backed horse. Although the means shown for connecting the tree-bars is preferably employed, a rigid connection will answer fully all the requirements of my remaining improvements, as hereinafter described. As seen in the drawings, the seat D has, in general, the usual form, and upon its lower side is provided with a suitable supporting-plate, E, which at points corresponding to the fore and aft positions of the plates C has hinged one end of a link, F, the opposite or lower end of which latter part is hinged to or upon the upper end of a second link, F′, while the cross-bar that forms the lower end of said link F′ is contained within a semi-cylindrical groove, *c′*, formed within the inner face, and near the longitudinal center of said plate C, the whole, in connection with the other links and their attachments, forming flexible connections between the tree-bars and seat, which permits them to move vertically toward or from each other. The object sought by thus connecting the seat and tree-bars is to enable springs to be employed between the same, so as to lessen the shock caused by the vertical movements of the horse. The springs employed are preferably short cylinders of rubber G, which rest within the space formed between the outer face of the plate C and the inner faces of the links F and F′ and the supporting-plate E, and are secured in place by any suitable means. The pommel-lip D″ is constructed of or from leather *d*, which is tacked or otherwise secured to or upon the vertical front side of the pommel D′. The upper side of said leather lip is then covered by means of a plate of spring or sheet metal, *d′*, which is also well tacked in position, and when the usual padding is fitted under said pommel receives and turns the ends of the tacks, and prevents the same from passing upward so as to damage the tree-covering. The edges of the belly of the tree are higher than its center, so that when the seat is drawn to place it will not touch at its center the horse's back, but will form a firm and elastic bearing for the rider without in any manner being liable to injure the horse.

The improved tree thus constructed is easy for both rider and horse, as by its use the usual uncomfortable shocks occasioned by the movements of the horse are entirely avoided; in addition to which advantage the device is simple in construction, and can be furnished at a comparatively small cost.

Having thus fully set forth the nature and merits of my invention, what I claim as new is—

1. In combination with the tree-bars A and A, connected together by means of the strap B, and with the seat D, provided with the plate E, the links F and F′, hinged together and to said strap and plate, substantially as and for the purpose specified.

2. In combination with the tree-bars A and A, seat D, and links F and F′, the rubber springs G, arranged to operate in the manner and for the purpose substantially as shown.

3. In combination with the tree-bars A and A, the strap B, provided with the pivotal lugs *b*, and the straps C, provided with the semi-cylindrical grooves *c*, substantially as and for the purpose set forth.

4. The pommel-lip D″, composed of the leather body *d* and spring or sheet metal covering *d′*, substantially as and for the purpose shown and described.

5. As a new article of manufacture, a side-saddle having its several parts constructed and combined to operate substantially as and for the purpose specified.

In testimony whereof I hereunto set my hand this 20th day of September, 1873.

JACOB STRAUS.

Witnesses:

HENRY WILKE, Jr.,
JAMES MCARTHUR.